United States Patent
Liu et al.

(10) Patent No.: US 7,241,527 B2
(45) Date of Patent: Jul. 10, 2007

(54) METHOD AND APPARATUS FOR FACILITATING A CHEMICAL REACTION

(75) Inventors: Qin Liu, Corvallis, OR (US); Joseph W Tsang, Corvallis, OR (US); L. Chris Mann, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 568 days.

(21) Appl. No.: 10/323,948

(22) Filed: Dec. 18, 2002

(65) Prior Publication Data

US 2004/0121196 A1    Jun. 24, 2004

(51) Int. Cl.
  *H01M 4/00* (2006.01)
  *H01M 8/04* (2006.01)
  *B32B 5/16* (2006.01)
  *B23B 9/00* (2006.01)
  *B01J 38/02* (2006.01)

(52) U.S. Cl. .......................... 429/40; 429/26; 429/17; 429/13; 429/20; 429/24; 428/378; 428/403; 502/56; 502/53

(58) Field of Classification Search .................. 429/13, 429/12, 125; 502/53, 56
See application file for complete search history.

(56) References Cited

U.S. PATENT DOCUMENTS

| | | |
|---|---|---|
| 5,401,589 A | 3/1995 | Palmer et al. |
| 5,705,265 A | 1/1998 | Clough et al. |
| 6,475,249 B1 | 11/2002 | Hsu et al. |

FOREIGN PATENT DOCUMENTS

| | | |
|---|---|---|
| JP | 07-295228 | * 11/1995 |
| WO | WO 01/51410 A1 | * 7/2001 |

* cited by examiner

*Primary Examiner*—Patrick Joseph Ryan
*Assistant Examiner*—Angela J. Martin

(57) ABSTRACT

A method of facilitating a chemical reaction includes raising a temperature of a protective layer covering a catalyst in the presence of a chemical solution.

26 Claims, 6 Drawing Sheets

US 7,241,527 B2

METHOD AND APPARATUS FOR FACILITATING A CHEMICAL REACTION

BACKGROUND

During the past several years, the popularity and viability of fuel cells for producing large and small amounts of electricity has increased significantly. Fuel cells conduct an electrochemical reaction with chemicals such as hydrogen and oxygen to produce electricity and heat. Fuel cells are similar to batteries, but they can be "recharged" while providing power, and are much cooler and cleaner than devices that combust hydrocarbons.

Fuel cells provide a DC (direct current) voltage that may be used to power motors, lights, computers, or any number of electrical appliances. There are several different types of fuel cells, each using a different chemistry. Fuel cells are usually classified by the type of electrolyte used. The fuel cell types are generally categorized into one of five groups: proton exchange membrane (PEM) fuel cells, alkaline fuel cells (AFC), phosphoric-acid fuel cells (PAFC), solid oxide fuel cells (SOFC), and molten carbonate fuel cells (MCFC).

Each of the fuel cells mentioned above uses oxygen and hydrogen to produce electricity. The oxygen for a fuel cell is usually supplied by the ambient air. In fact, for the PEM fuel cell, ordinary air may be pumped into the cathode. However, hydrogen is not as readily available as oxygen. Hydrogen is difficult to generate, store and distribute.

One common method for producing hydrogen for fuel cells is the use of a reformer. A reformer produces hydrogen from hydrocarbons or alcohol fuels. The hydrogen can then be fed to the fuel cell. However, if the hydrocarbon fuel is gasoline or some of the other common hydrocarbons, undesirable byproducts are produced, such as $SO_x$, $NO_x$ and others. These byproducts are not only pollutants, but can damage the reformer. Sulfur, in particular, must be removed from the reformer or may damage the electrode catalyst. Additionally, reformers usually operate at high temperatures and consume significant energy.

Alternatively hydrogen can be generated from a precursor at ambient temperature using a catalyst. However, such chemical reactions for producing hydrogen may require a pump to move the precursor, a hydrogen-bearing chemical mixture, into a reaction chamber filled with a catalytic agent. As soon as the chemical mixture is exposed to a catalyst, the reaction rate is accelerated. Thus, the chemical mixture and catalyst must be separated until hydrogen production is to start. Consequently, a pump is needed to selectively move the chemical mixture from storage to the reaction chamber.

Further, for portable fuel cell applications, it is difficult to miniaturize the fuel cell and hydrogen-producing system, and still produce hydrogen on demand. Once a chemical reaction in the presence of a catalyst has begun, the reaction is difficult to stop and/or restart. The electrical demands of portable electronics may vary widely, therefore a fuel cell providing power to portable electronics must be equipped to efficiently provide varying amounts of hydrogen on-demand to produce the electricity needed.

One solution to produce hydrogen on-demand is to use micro-pumps to deliver a certain amount sodium borohydride (hydrogen-bearing solution) to a catalyst bed. However, a by-product of the sodium borohydride, sodium metaborate, tends to absorb water and gel when allowed to cool. This hinders access to the catalyst and renders the water needed for the reaction unavailable.

Another solution is to heat the sodium borohydride, which increases the rate of hydrogen production. However, using heat to increase hydrogen production on-demand results in higher parasitic losses.

SUMMARY

In one of many possible embodiments, a method of facilitating a chemical reaction includes raising a temperature of a protective layer covering a catalyst in the presence of a chemical solution.

BRIEF DESCRIPTION OF THE DRAWINGS

In the drawings, identical reference numbers indicate similar, but not necessarily identical, elements.

DETAILED DESCRIPTION OF ILLUSTRATED EMBODIMENTS

The principles, devices and methods described herein can be implemented in a wide variety of chemical reactions including those for producing hydrogen for fuel cells. The kinds of fuel cell applications compatible with the disclosed principles include, but are not limited to, PEM fuel cells, AFCs, PAFCs, SOFCs, and MCFCs.

Figure 1:
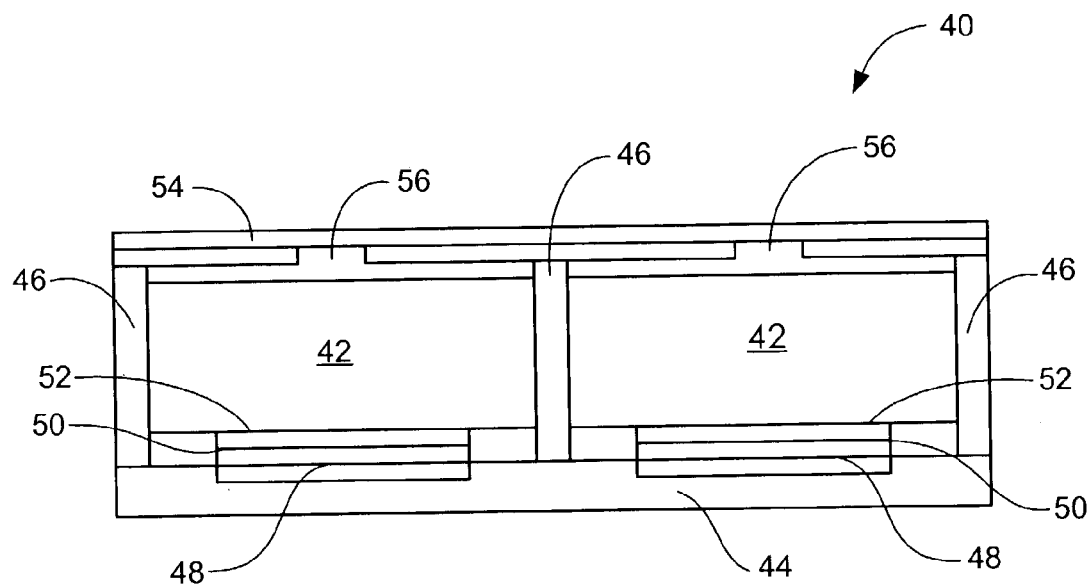
FIG. 1 is a diagrammatical illustration of a chemical reaction system according to one embodiment of the present invention.

Turning now to the figures, and in particular to FIG. 1, a chemical reaction system or cartridge, for example a hydrogen generating system (40), is shown. According to the embodiment of FIG. 1, the hydrogen generating system (40) may include one or more chemical mixtures arranged in chambers, for example chemical mixture cells (42). The chemical mixture cells (42) are preferably supported on a common base (44) as shown in FIG. 1, but this is not necessarily so. Each chemical mixture cell (42) may be completely independent. Further, the number of chemical mixture cells (42) is not limited to the two-cell configuration shown. There may be one or more chemical mixture cells (42). The two-cell configuration is merely an example for purposes of illustration. These cells (42) may be arranged side-by-side, as in FIG. 1, or stacked.

The base (44) supports a plurality of walls (46) that divide and define the cells (42) for holding the chemical mixture. Both the base (44) and the walls (46) may be made of any material compatible with the chemical mixture being contained. For example the base (44) and walls (46) may include plastics, ceramics, metals, composites, or other materials.

According to the present embodiment of the hydrogen generating system (40), the chemical mixture may be a hydrogen-bearing solution that releases hydrogen gas— especially at elevated temperatures and/or in the presence of catalysts. For example an aqueous sodium borohydride releases hydrogen gas at elevated temperatures and in the presence of a catalyst. Other hydrogen bearing solutions may also be used to generate hydrogen, including, but not limited to: amino boranes and other metal borohydrides.

Each of the chemical mixture cells (42) may include a heating element (48), for example, a thin film heating element such as those used in a thermal inkjet (TIJ) printhead. Electrical current selectively supplied to the heating element (48) causes the element (48) to produce heat and warm the chemical mixture in the corresponding cell (42). The heating elements (48) may advantageously be used in a selectively controlled manner such that each of the heating elements (48) is activated independently of the others. Alternatively, two or more of the heating elements (48) may be activated at once by a single circuit. Further, the heating element is not limited to the heating element shown. Any other heating elements may also be used, including, but not limited to: a simple resistor.

Each of the chemical mixture cells (42) may also include a catalyst for facilitating the production of hydrogen gas from the hydrogen-bearing chemical solution. The catalyst may include, but is not limited to: ruthenium and platinum. According to the embodiment of FIG. 1, the catalyst is a layered or planar catalyst (50) disposed on the heating element (48). However, the catalyst (50) is not limited to the location shown adjacent to the heating element (48). The catalyst (50) may be located in any position within the chemical mixture cells (42).

Further, the layered catalyst (50) arranged in each cell (42) is coated with a protective layer (52). The protective layer (52) insulates the catalyst (50) from contact with the chemical mixture contained in each cell (42) at ambient conditions. Therefore, the catalyst (50) may advantageously be placed in the presence of the chemical mixture without immediately increasing a rate of chemical reaction. The protective layer or coating (52) and the compartmentalized cells (42) facilitate the production of hydrogen (or other products in other chemical reactions) on-demand. By inserting a supply of chemical solution into the plurality of cells (42) shown, the chemical solution is compartmentalized for use on an as-needed basis.

The protective layer (52) is removed by elevating the temperature of the cells (42) and/or the protective layer (52) above ambient conditions. Materials that may adequately provide the heat-removable protective layer (52) include, but are not limited to: waxes, polymers or copolymers of olefins, fluorinated olefins, or fluorinated ethers with appropriate molecular weights. These materials readily melt at elevated temperatures (e.g. approximately 50 to 95° C.), allowing the catalyst (50) to be selectively exposed to the chemical mixture contained in the individual cells (42). As the catalyst (50) is directly exposed to the chemical mixture such as sodium borohydride, the rate of hydrogen production also increases. Depending on the amount of hydrogen needed by a fuel cell to power an electrical load, any number of the cells can be activated by elevating the temperature in the individual cells and thereby melting or removing the protective coating (52) from the catalyst (50).

In order to raise the temperature of the protective coating (52) and remove it from the catalyst (50), the heating elements (48) are selectively activated. It will be understood by those of skill in the art with the benefit of this disclosure that a control circuit extending to each of the heating elements (48) may be routinely designed to allow selective activation of individual elements (48).

According to the embodiment of FIG. 1, the close proximity of the protective coating (52) to the heating element (48) (with only the layered catalyst (50) between the protective coating (52) and the heating element (48)) advantageously facilitates low power consumption to heat and therefore remove the protective coating (52). Therefore, parasitic losses of a fuel cell—to which the hydrogen generating system (40) may be providing hydrogen as a fuel—are minimized.

In addition, as shown in FIG. 1, each of the cells (42) may include a cover layer (54) to enclose the cells (42) and facilitate operation of the cells (42) in any orientation. Portable electronics are often manipulated in many different orientations. Therefore, the hydrogen generating system (40) may need to operate in any orientation in order to provide hydrogen to a fuel cell that may be powering the portable electronics. Accordingly, the cover layer (54) may include plastic, composite, metal, ceramic, or other materials, and it may also include at least one initiator (56).

An initiator (56) is a feature designed for a first or controlled failure. The initiator (56) may be a crimp, a weak spot, a gap, or any other initiation mechanism at which the cover layer (54) is designed to open based on predetermined conditions. As hydrogen gas is generated, pressure increases within the cells (42). When the pressure reaches a predetermined level, for example, about 80% above ambient for shipping and other use considerations, the initiator will cause a breach in the cover layer (54) at the initiator (56) location. Accordingly, the produced hydrogen will have a path to exit the cell (42), where it can be introduced to a fuel cell anode (discussed further below) for electricity production. In some embodiments, the initiator may be a hyrdophopic membrane, such as gortex.

The protective layer (52) covering the catalyst (50) at ambient conditions allows the hydrogen-bearing fuel to be stored in the presence of the catalyst (50) in a stable condition until hydrogen is needed. When hydrogen is needed, the temperature of the protective layer (52) is raised by the heating element (48), melting and removing the protective layer (52). Further, the hydrogen-bearing fuel can be compartmentalized into a plurality of cells (42) as shown, with each cell (42) having its own covered catalyst (50) and separately controlled heating element (48). The compartmentalizing of the hydrogen-bearing solution provides for hydrogen production according to the demands of the fuel cell and/or an electronic device powered by the fuel cell.

Figure 2:
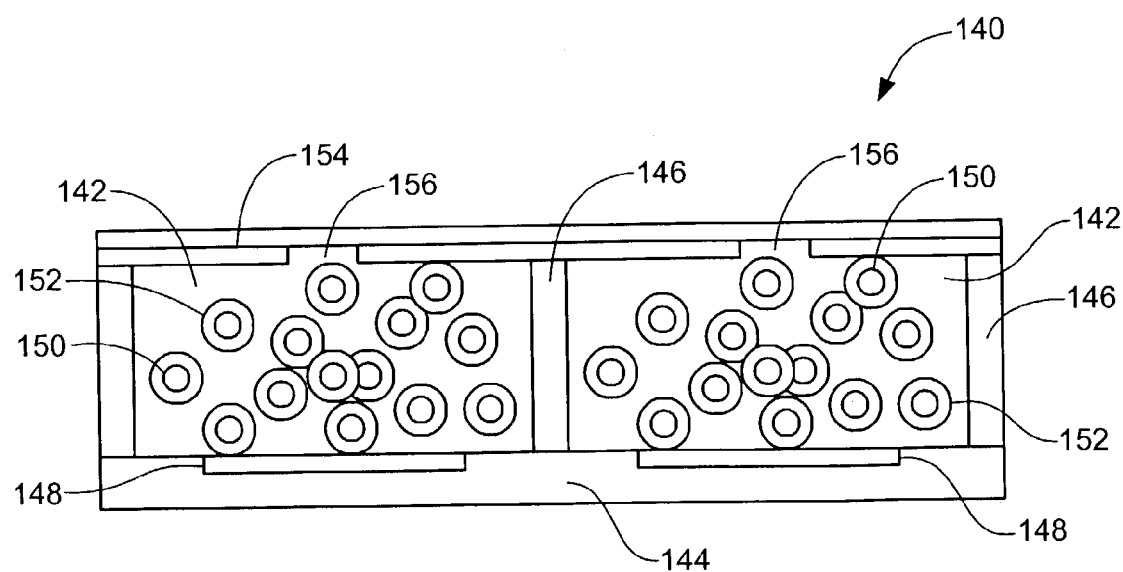
FIG. 2 is a diagrammatical illustration of a chemical reaction system according to another embodiment of the present invention.

Referring next to FIG. 2, another embodiment of a hydrogen generating system (140) is shown. Similar to the embodiment of FIG. 1, the hydrogen generating system (140) includes one or more chemical mixtures arranged in one or more cells (142). The cells (142) are preferably supported on a common base (144), as shown in FIG. 2, but this is not necessarily so. Each chemical mixture cell (142) may be completely independent. Further, the number of chemical mixture cells (142) is not limited to the two-cell configuration shown. There may be any number of cells. The two-cell configuration is merely an example.

The base (144) preferably supports a plurality of walls (146) that define the cells (142). The base (144) and walls (146) may be similar or identical to the cells (42) and walls (44) of FIG. 1. Therefore, the base (144) and walls (146) can be made of any material compatible with the chemical mixture being contained.

According to the present embodiment of the hydrogen generating system (140), the chemical mixture may be a hydrogen bearing solution which may contain one or more of these components: alkali metal borohydrides such as lithium borohydride, sodium borohydride, and potassium borohydride; alkali and alkaline metal hydroxides that include but are not limited to: lithium hydroxide, sodium hydroxide, potassium hydroxide, magnesium hydroxide, and calcium hydroxide; a polymer as a viscosity modifier; and water. In addition to the present embodiment, this or a similar chemical mixture may be used with any embodiment of the present invention, including all those illustrated and described herein.

As with the embodiment of FIG. 1, each of the cells (142) includes a heating element (148), for example, a thin film heating element such as those used in a thermal inkjet (TIJ) printhead. The heating elements (148) may be used advantageously in a selectively controlled manner, such that each of the heating elements (148) is activated independently, or in combination, with the others.

Each of the chemical mixture cells (142) may also include a catalyst (150) for facilitating the production of hydrogen gas from the hydrogen-bearing chemical solution. The catalyst may include, but is not limited to: ruthenium and platinum. According to the embodiment of FIG. 2, however, the catalyst is formed into one or more beads or spheres (150) that are placed in the cells (142). As the cells (142) are filled with the hydrogen-bearing chemical solution, the catalyst beads (150) tend to be distributed amongst the solution. The number of catalyst beads (150) is adjustable within any range to facilitate the reaction of the hydrogen-bearing solution to generate hydrogen gas.

The catalyst beads (150) in each cell (142) are coated with a protective layer (152). Similar to the embodiment of FIG. 1, the protective layer (152) insulates the catalyst beads (150) from the chemical mixture contained in each cell (142) at ambient conditions. Therefore, the catalyst beads (150) may advantageously be placed in the presence of a chemical mixture without immediately increasing a rate of chemical reaction. The protective layer or coating (152) and the compartmentalized cells (142) facilitate the production of hydrogen (or other products in other chemical reactions) on-demand. The protective layer (152) of the present embodiment is heat-removable and made of the same or similar materials as described above with reference to the planar protective layer (52, FIG. 1). Therefore, depending on the amount of hydrogen needed by a fuel cell to power an electrical load, any number of the cells (142) can be activated by elevating the temperature in the individual cells (142) and removing the protective coating (152) from the catalyst beads (150). As with the embodiment of FIG. 1, heat may be supplied by the heating elements (148) to remove the protective coating (152).

In addition, each of the cells (142) may include a cover layer (154) and initiator (156) similar or identical to the cover layer (52, FIG. 1) and initiator (56, FIG. 1) described above. The cover layer (152) is provided to enclose the cells (142) and facilitate operation of the cells (142) in any orientation. Due to the initiator (156), the produced hydrogen will have a path to exit the cell (142) and eventually be introduced to a fuel cell anode.

The protective layer (152) covering the catalyst beads (150) at ambient conditions allows the hydrogen-bearing fuel to be stored in the presence of the catalyst (150) in a stable condition until hydrogen gas is needed. When hydrogen gas is needed, the temperature of the protective layer (152) is raised by the heating element (148) (or any other heating element), which raises the temperature of the hydrogen-bearing solution and removes (melts) the protective layer (152). When the protective layer (152) is removed from the catalyst beads (148), the chemical solution is directly exposed to the catalyst beads (148) and the chemical reaction rate for generating hydrogen is increased.

Figure 3:
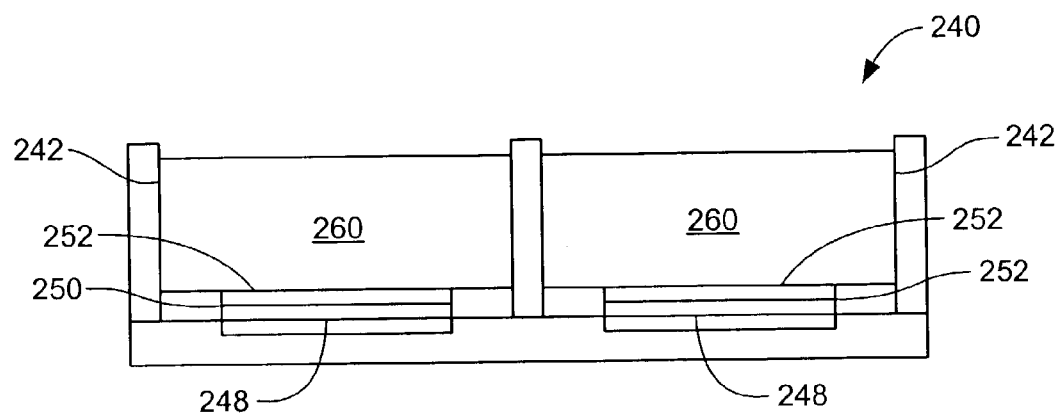
FIG. 3 is a diagrammatical illustration of a chemical reaction system according to another embodiment of the present invention.
Figure 4:
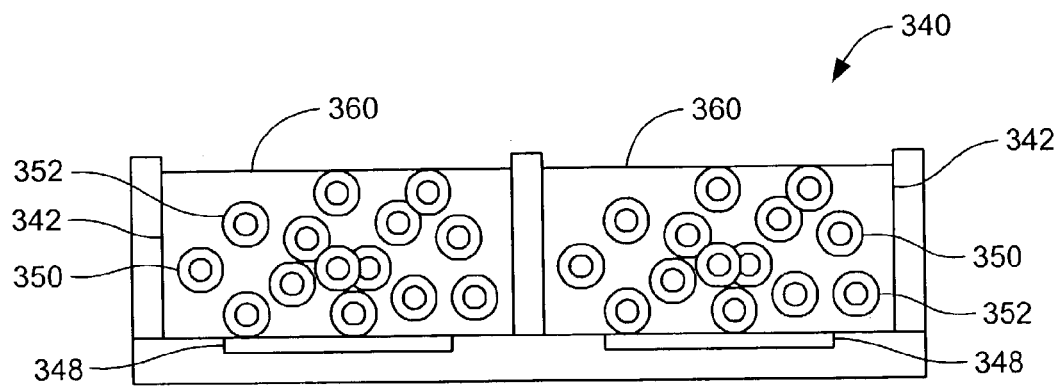
FIG. 4 is a diagrammatical illustration of a chemical reaction system according to another embodiment of the present invention.

As mentioned above, the embodiments of FIGS. 1 and 2 include cover layers (54 and 154, respectively) to facilitate operation of the hydrogen generating systems (40 and 140) in any orientation. However, other embodiments may also be operable in multiple orientations without the need of the cover layers (54 and 154). Referring next to FIGS. 3–4, alternative embodiments of a hydrogen generating system (240/340) are shown.

As with the embodiments of FIGS. 1–2, the hydrogen generating systems (240/340) of FIGS. 3–4 include one or more chemical mixtures arranged in one or more cells (242/342). The chemical mixtures, however, are gels (260/360) capable of holding their shape. Therefore, it is not necessary to include a cover layer (42, FIG. 1). A gel, as used herein, includes colloids in a semisolid configuration.

According to the embodiments of FIGS. 3 and 4, the gels (260/360) are hydrogen-bearing gels such as sodium borohydride gels. The gels (260/360) are made by the addition of polymers or oligomers of various compounds, such as poly(ethylene oxide), polyethers, poly(ethyleneimine) or other amino polymers, polyacrylates, in the proper concentration to the hydrogen containing compounds.

Each of the gels (260/360) is part of a fuel pellet that includes a chemical solution (in the present embodiment the sodium borohydride gel), a heating element (248/348), and a catalyst (250/350) covered by a protective layer (252/352). The heating element (248/348) may be a TIJ heating element. The fuel pellets may be compartmentalized as shown in FIGS. 3–4 into the one or more cells (242/342). The catalyst of the fuel pellets may be arranged in planar layers (250) as shown in FIG. 3, or the catalyst may include one or more spheres or beads (350) as shown in FIG. 4. Whether the catalyst is planar (250, FIG. 3) or beaded (350, FIG. 4), the catalyst includes a protective layer (252 in FIG. 3, 352 in FIG. 4) insulating the catalyst (250/350) from the gel (260/360) at ambient conditions.

As a fuel gas such as hydrogen is needed, the heating elements (248/348) may be separately or collectively activated to raise the temperature of the protective coatings (252/352) and thus remove those coatings from covering the catalyst (250/350). The number of cells (242/342) or fuel pellets activated will depend on the demand for hydrogen or other fuel gas. As with the embodiments of FIGS. 1–2, the protective coatings (252/352) of FIGS. 3–4 may include waxes, polyolefins, and/or other non-reactive coatings that are easily melted and removed at temperatures above ambient. When the protective coatings (252/352) are removed, the catalyst (250/350) is directly exposed to the gels (260/360), which increases the rate of hydrogen production. The hydrogen gas may then be supplied, for example, to a fuel cell.

Therefore, the embodiments described provide a heat-assisted method and apparatus for producing hydrogen gas. The heat provided by the heaters (48, etc.) is minimal as compared to hydrogen generating systems that use heat as the primary mode of catalysis. Further, these embodiments eliminate the need for micro-pumps and their associated controls and electronics often used to move various amounts of hydrogen-bearing solution into the presence of a catalyst.

Figure 5:
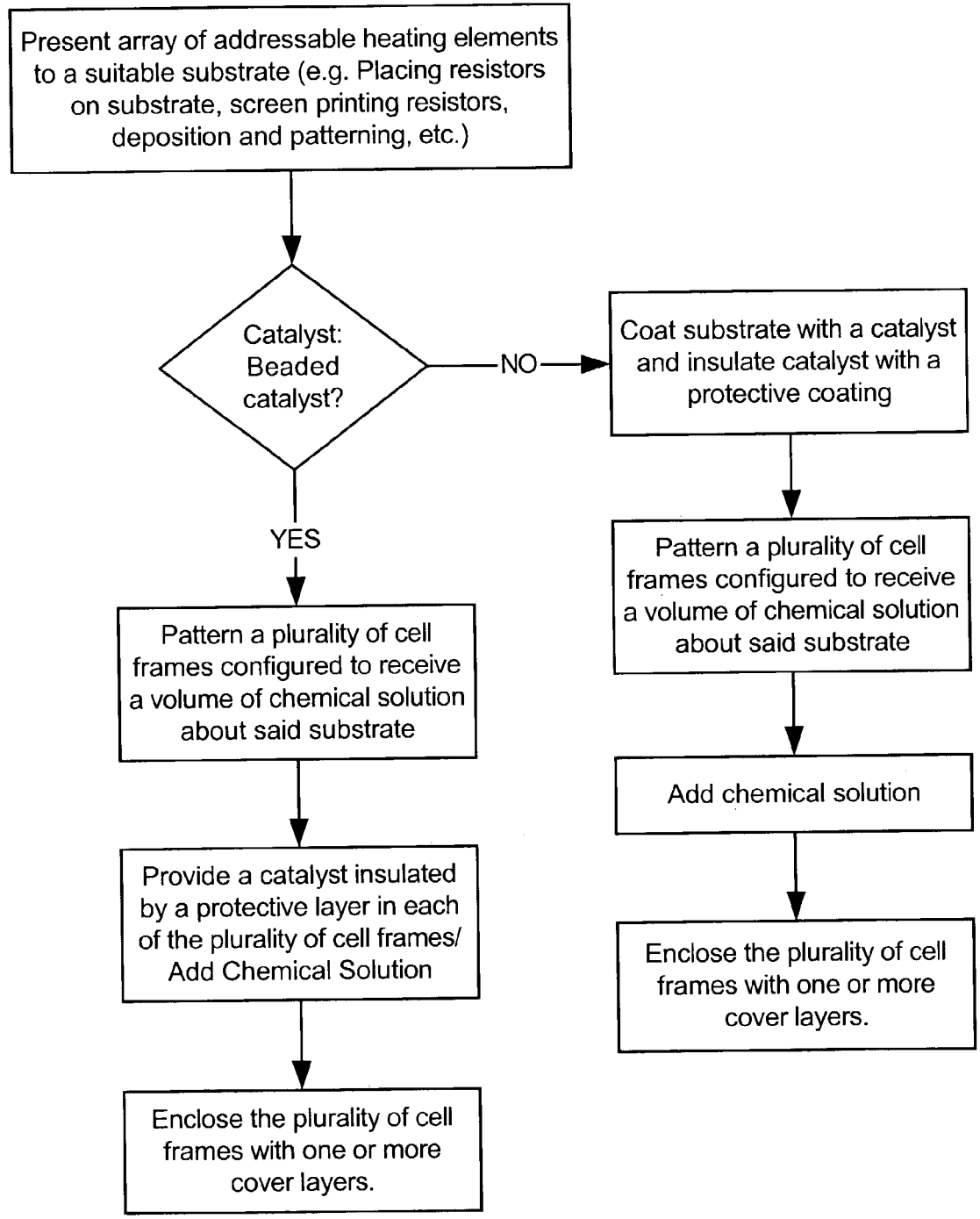
FIG. 5 is a flowchart illustrating a method of making a chemical reactor according to another embodiment of the present invention.

A chemical reactor such as the hydrogen generating systems (40, etc., FIG. 1) described above may be made by a number of methods. For example, with reference to FIG. 5, a suitable substrate can be presented with an array of addressable heating elements (48, etc., FIG. 1), such as resistors. The resistors can be incorporated by various methods ranging from simply placing resistors on the substrate, to screen printing resistor elements, to deposition and patterning the resistor elements with methods commonly used in the electronics industry. These deposition and patterning methods may include, but are not limited to: sputtering, plating, CVD, PECVD, and photomask/etch and laser ablation. The array of heating elements can be addressed by direct drive or with logic depending on the final application.

Methods commonly used in the electronics industry are readily applicable to prepare these control circuits with the benefit of this disclosure.

Depending on the application, which may range from an on-board power supply for electronic devices, to sensors, to automotive applications, various methods can be used to construct the cell frames. Patterning photosensitive materials or screen printing can be used for cells with small dimensions (micrometers to millimeters). Injection molding of thermal plastics or molding of polymers or composites may be used for larger dimensions. The cell frames may be built right on top of the substrate, bonded to the substrate (if they are prefabricated), or the cell frame and the substrate may be integrated and made by injection molding a single part.

The cover layer for the cells in the case of liquid solutions may be bonded to the cell frame prior to or after the introduction of the liquids. In the former case, another layer or "plug" may be used to form a seal. Alternatively the cover layer may be built as an integral part of the frame and the entire part may be bonded to the substrate. Further, each of the one or more individual cells (42, FIG. 1) may be filled with a hydrogen-bearing chemical solution. However, in some embodiments, especially those depicted in FIGS. 3–4, there is no cover enclosing each of the cells (260).

According to some methods, a beaded catalyst covered with a protective layer (as described above) may be added to the cells and/or the hydrogen-bearing chemical solution. According to other embodiments, the substrate is coated with a catalyst and then insulated by a removable protective coating. It will be appreciated, however, that the order of the method steps may be altered and is not limited to the sequence discussed above or presented in FIG. 5.

Figure 6:
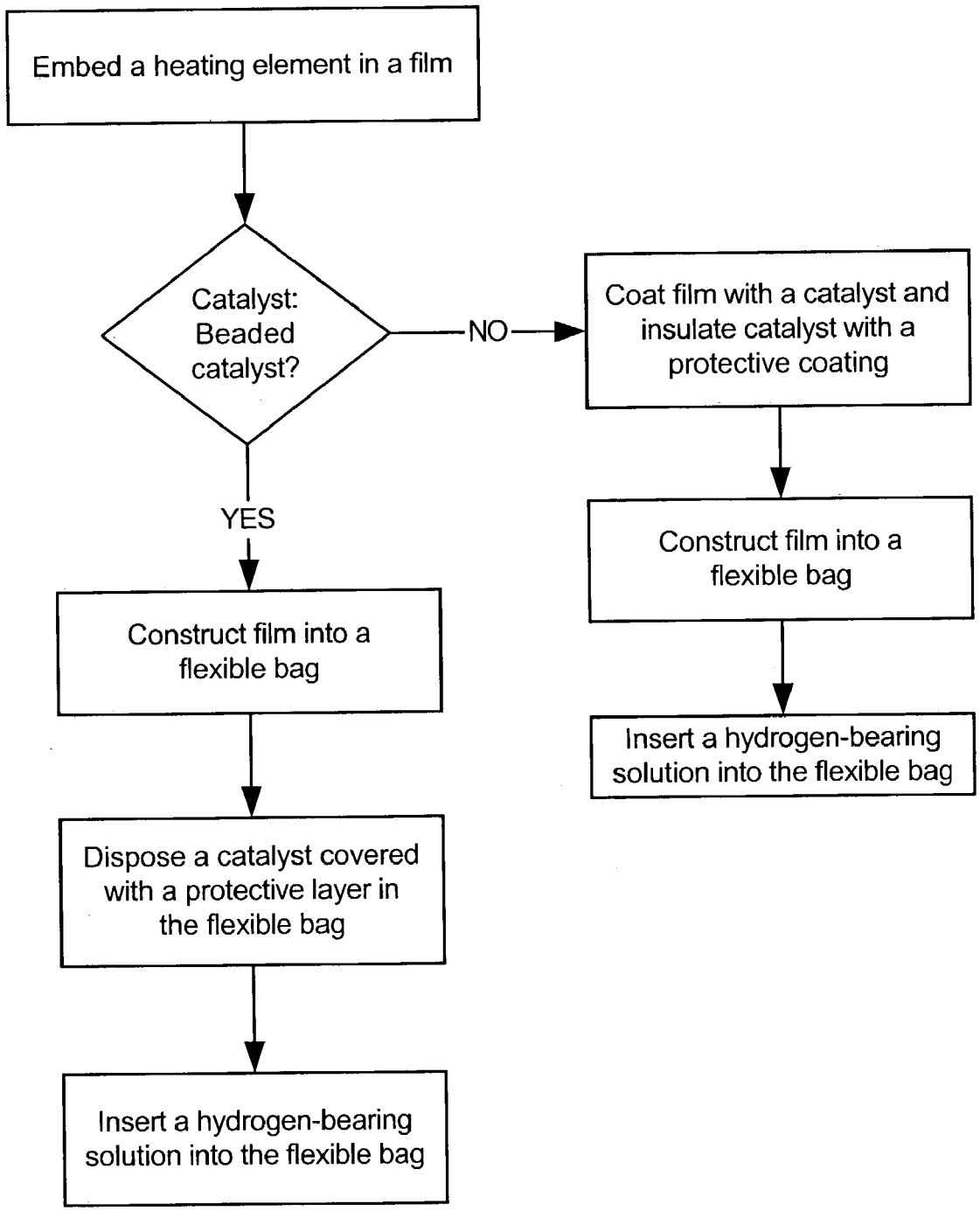
FIG. 6 is a flowchart illustrating a method of making a chemical reactor according to another embodiment of the present invention.

Yet another method of making the cells (42, FIG. 1) may include embedding heating elements (48, etc., FIG. 1) in films, which may then be constructed into bags or cells to hold solutions and contain a catalyst covered with a protective layer. This method may result in one or more cells, such as cells (42, FIG. 1) shown above. However, the cells (42, FIG. 1) constructed of films may be flexible and conform to any shape. Further, in some embodiments, the films that define the cells (42, FIG. 1) may be coated with catalyst and a removable protective layer to insulate the catalyst from the solutions that may be contained by the cell (42, FIG. 1) at ambient conditions. Again different patterning techniques may be used to modulate the amount of heating elements or catalyst in the films. The catalyst may also be added separately and/or with a supply of hydrogen-bearing chemical solution as a beaded catalyst coated by a removable protective layer. Some of the steps of the method described above are illustrated by flowchart in FIG. 6. It will be appreciated, however, that the order of the method steps may be altered and is not limited to the sequence discussed above or presented in FIG. 6.

Figure 7:
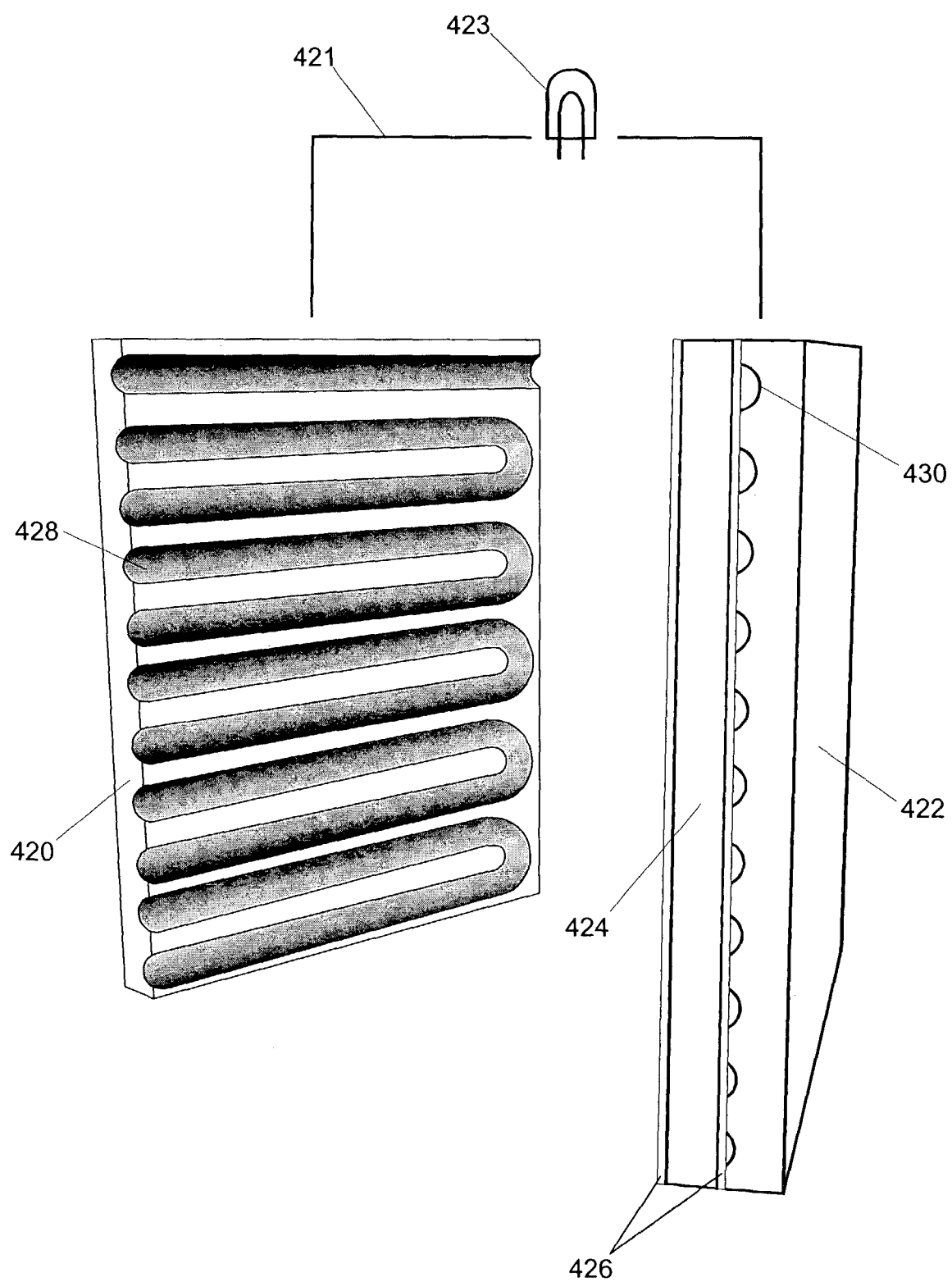
FIG. 7 is a disassembled view of a PEM fuel cell that may be used with the chemical reactions systems according to another embodiment of the present invention.

The hydrogen generating systems described above may provide hydrogen to any fuel cell type, including the ones mentioned in the background of this disclosure. The hydrogen systems may operate as cartridges connected or otherwise in fluid communication with a fuel cell. The hydrogen generating systems of FIGS. 1–4 may, however, be particularly useful for PEM fuel cells such as the one shown in FIG. 7. FIG. 7 illustrates a PEM fuel cell (400), which includes four basic elements: an anode (420), a cathode (422), an electrolyte (PEM) (424), and a catalyst (426) arranged on each side of the electrolyte (424).

The anode (420) is the negative post of the fuel cell and conducts electrons that are freed from hydrogen molecules such that the electrons can be used in an external circuit (421). The anode (420) may include channels (428) etched therein to disperse the hydrogen gas as evenly as possible over the surface of the catalyst (426).

The cathode (422) is the positive post of the fuel cell, and has channels (430) etched therein to evenly distribute oxygen (usually air) to the surface of the catalyst (426). The cathode (422) also conducts the electrons back from the external circuit (421) to the catalyst (426), where they can recombine with the hydrogen ions and oxygen to form water. Theoretically, water is the only by-product of the PEM fuel cell (400).

The electrolyte is the proton exchange membrane (PEM) (424). The PEM (424) is a specially treated material that conducts positively charged ions and prevents the passage of electrons.

The catalyst layer (426) is typically a platinum powder thinly coated onto carbon paper or cloth. The catalyst layer (426) is usually rough and porous so as to maximize the surface area that can be exposed to the hydrogen or oxygen. The catalyst (426) facilitates the electrochemical reaction of hydrogen and oxygen.

In a working fuel cell, the PEM (424) is sandwiched between the anode (420) and the cathode (422). The operation of the fuel cell can be described generally as follows. Hydrogen gas ($H_2$) from one of the hydrogen generating systems described above enters the fuel cell at the anode (420). When an $H_2$ molecule comes into contact with the platinum on the catalyst (426), it splits into two $H^+$ ions and two electrons ($e^-$). The electrons are conducted through the anode (420), where they make their way through the external circuit (421) that may be providing power to do useful work (such as turning a motor or lighting a bulb (423)) and return to the cathode side of the fuel cell (400).

Meanwhile, at the cathode (422), oxygen gas ($O_2$) is provided to the catalyst (426). In some PEM fuel cell systems, the $O_2$ source may be air. Oxygen reacts with $H^+$ ions transported through the PEM (424) and electrons from the external circuit in the presence of the catalyst (426) to form water.

The PEM fuel cell reaction just described produces less than 1 volt under load. In order to raise the voltage and provide enough power for practical applications, separate fuel cells are often combined to form a fuel cell stack.

PEM fuel cells typically operate at fairly low temperatures (about 80° C./176° F.), which allows them to warm up quickly and to be housed in inexpensive containment structures because they do not need any special materials capable of withstanding the high temperatures normally associated with electricity production.

Figure 8:
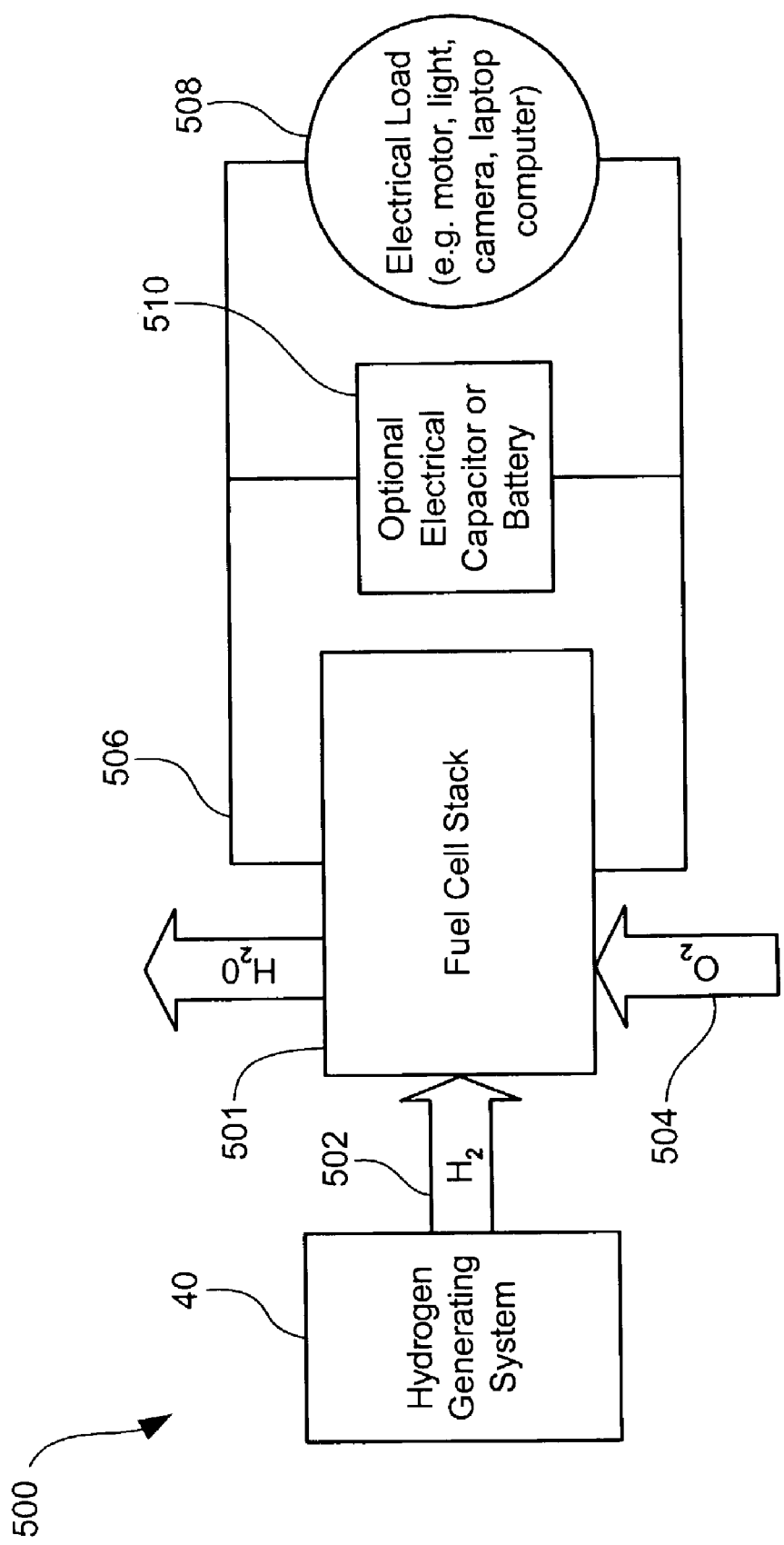
FIG. 8 is a block diagram of an electronic device with a fuel cell and a chemical reaction system according to another embodiment of the present invention.

Turning next to FIG. 8., an electronic device (500) is shown. FIG. 8 represents in schematic format an overview of the electronic device (500) using hydrogen generating systems and fuel cells such as those described above. Other fuel cells different from the embodiments shown may also be used.

According to the embodiment of FIG. 8, a fuel cell stack (501) is in fluid communication with the hydrogen generating system (40). The fuel cell stack (501) includes a plurality of the fuel cells. And while FIG. 8 refers to the hydrogen generating system (40) of FIG. 1, any of the other embodiments of the hydrogen generating system (140/240/340) may also be used.

The hydrogen generating system (40) provides a supply of fuel along a path represented by an arrow (502). A supply of oxygen (that may be provided by ambient air) is also in fluid communication with the fuel cell stack (501) as represented by another arrow (504). As shown in FIG. 8, water ($H_2O$) may be produced as a byproduct of the operation of the fuel cell stack (501).

The fuel cell stack (501) may provide power via an external circuit (506) to an electrical load (508). The electrical load (508) may include any electrically operated device including, but not limited to: an automobile motor (and other automotive electronics), a light, a camera, a home auxiliary power unit, a computer, or other devices consuming electricity. The external circuit (506) may also be connected to an optional electrical capacitor or battery (510), which is shown in electrical parallel with the fuel cell stack (501). The electrical capacitor or battery (510) may provide auxiliary power to the electrical load (508).

As the electrical load (508) increases, individual cells (42, FIG. 1) of the hydrogen generating system (40) may be activated to provide a sufficient supply of hydrogen to the fuel cell stack (501). The hydrogen-bearing solution contained by the cells (42, FIG. 1) of the hydrogen generating system (40) is conveniently stored in the presence of, but insulated from, the catalyst (50, FIG. 1) until hydrogen is needed.

The preceding description has been presented only to illustrate and describe various embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. A method of facilitating a chemical reaction comprising;
   disposing a catalyst in a chemical solution, said catalyst being separated from said chemical solution by a protective layer,
   raising a temperature of said protective layer covering said catalyst by activating a heating element to expose said catalyst to a chemical solution;
   wherein said raising said temperature of said protective layer exposes said catalyst to said chemical solution, said method further comprising catalyzing said chemical solution with said exposed catalyst.

2. The method of claim 1, further comprising removing said protective layer by said raising of the temperature.

3. The method of claim 2, further comprising exposing said catalyst directly to said chemical solution by said removing of said protective layer.

4. The method of claim 1, wherein said chemical solution is an amino borane.

5. The method of claim 1, wherein said chemical solution is a metal borohydride.

6. The method of claim 5, wherein said metal borohydride comprises a gel.

7. The method of claim 5, wherein the metal borohydride is aqueous sodium borohydride.

8. The method of claim 7, further comprising generating hydrogen gas from said aqueous sodium borohydride exposed to said catalyst.

9. The method of claim 1, wherein said protective layer comprises wax, polymers, or copolymers of olefins.

10. The method of claim 1, further comprising compartmentalizing said chemical solution and providing a catalyst with a protective layer in each compartment.

11. The method of claim 10, further comprising selectively raising the temperature of individual compartments to remove said protective layers from said catalysts of selected compartments.

12. The method of claim 10, wherein each compartment of said chemical solution opens at an initiation point, wherein said initiation point opens automatically when gas produced by said chemical solution reaches a pressure threshold.

13. The method of claim 12, wherein said initiation point comprises a hydrophobic membrane.

14. The method of claim 12, wherein said initiation point comprises a crimp, a weak spot or a gap in a cover of each said compartment.

15. A method of catalyzing a chemical solution comprising:
    compartmentalizing said chemical solution into a plurality of cells, each of said plurality of cells comprising a catalyst covered by a protective layer and a heating element; and
    selectively activating said heating elements to heat said protective layer covering said catalyst in one or more of said plurality of cells to remove said protective layer and expose said catalyst to said chemical solution.

16. The method of claim 15, further comprising generating hydrogen from said chemical solution at a controlled rate by said selective heating.

17. The method of claim 16, further comprising providing said hydrogen to a fuel cell.

18. The method of claim 15, wherein each of said plurality of cells opens at an initiation point.

19. The method of claim 18, wherein said initiation point comprises a hydrophobic membrane.

20. The method of claim 18, wherein each of said plurality of cells is predisposed to open at said initiation point upon an increase in pressure beyond ambient pressure, said increase in pressure resulting from exposure of said chemical solution to said catalyst.

21. The method of claim 15, wherein said chemical solution comprises a metal borohydride.

22. The method of claim 21, wherein said metal borohydride comprises a gel.

23. The method of claim 15, wherein said protective layer comprises wax, polymers, or copolymers of olefins.

24. The method of claim 18, wherein said initiation point comprises a crimp, a weak spot or a gap in a cover of each compartment containing chemical solution and catalyst.

25. The method of claim 15, further comprising disposing a layer of catalyst covered by said protective layer on a said heating element.

26. The method of claim 15, wherein said compartmentalizing further comprises compartmentalizing said chemical solution in a plurality of cells that each comprise a flexible film containing said chemical solution.

* * * * *

UNITED STATES PATENT AND TRADEMARK OFFICE
CERTIFICATE OF CORRECTION

| | | |
|---|---|---|
| PATENT NO. | : 7,241,527 B2 | Page 1 of 1 |
| APPLICATION NO. | : 10/323948 | |
| DATED | : July 10, 2007 | |
| INVENTOR(S) | : Qin Liu et al. | |

It is certified that error appears in the above-identified patent and that said Letters Patent is hereby corrected as shown below:

In column 9, lines 25-26, in Claim 1, delete "comprising;" and insert -- comprising: --, therefor.

Signed and Sealed this

First Day of September, 2009

David J. Kappos
*Director of the United States Patent and Trademark Office*